United States Patent Office 3,812,168
Patented May 21, 1974

---

3,812,168
2-(N'-METHOXY-N'-METHYL-UREIDO)-BENZAMIDE
Karl Hoegerle, Basel, Switzerland, Jean-Claude Muller, St. Louis, France, and Christian Vogel and Jurg Rumpf, Binningen, near Basel, Switzerland, assignors to Ciba-Geigy Corporation, Ardsley, N.Y.
No Drawing. Original application Mar. 24, 1969, Ser. No. 809,978, now Patent No. 3,646,136. Divided and this application Nov. 19, 1971, Ser. No. 200,599
Claims priority, application Switzerland, Mar. 29, 1968, 4,710/68
Int. Cl. C07c 119/00
U.S. Cl. 260—453 R                               1 Claim

ABSTRACT OF THE DISCLOSURE

2-Ureido-benzamides of the formula

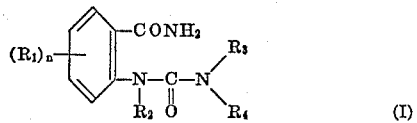

wherein:

$R_1$ represents halogen, lower alkyl or lower alkoxy of at most 5 carbon atoms,
$R_2$ represents hydrogen or lower alkyl of at most 5 carbon atoms,
$R_3$ represents hydrogen, lower alkyl or lower alkoxy of at most 5 carbon atoms,
$R_4$ represents an alkyl, alkenyl or alkynyl radical with at most 8 carbon atoms, lower halogen-alkyl, alkyoxyalkyl or alkylmercaptoalkyl of at most 5 carbon atoms or cycloalkyl having 3 to 10 carbon atoms as ring members, and
$n$ represents a whole number from 0 to 3, are disclosed as herbicidally active compounds of enhanced toxicity to undesireable plant growth and improved selectivity. A method for controlling undesirable plant growth with such compounds and compositions containing them as active ingredients are also disclosed.

This is a division of application Ser. No. 809,978, filed on Mar. 24, 1969, now U.S. Pat. 3,646,136.

DESCRIPTION OF THE INVENTION

The present invention concerns herbicidal 2-ureido-benzamides, processes for the production thereof, a method for controlling undesirable plant growth with the aid of the 2-ureido-benzamides as well as compositions containing the herbicidally active substances.

More particularly, the invention provides 2-ureido-benzamides of the general formula I

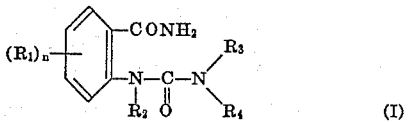

wherein:

$R_1$ represents halogen, lower alkyl or lower alkoxy of at most 5 carbon atoms,
$R_2$ represents hydrogen or lower alkyl of at most 5 carbon atoms,
$R_3$ represents hydrogen, lower alkyl or lower alkoxy of at most 5 carbon atoms,
$R_4$ represents an alkyl, alkenyl or alkylnyl radical with at most 8 carbon atoms, lower halogen-alkyl, alkoxyalkyl or alkylmercaptoalkyl of at most 5 carbon atoms or cycloalkyl having 3 to 10 carbon atoms as ring member, and
$n$ represents a whole number from 0 to 3, which are useful in the control of undesirable plant growth, especially in the control of weeds and wild grasses.

As lower halogen-alkyl radical $R_4$ represents an alkyl radical having 1 to 5 carbon atoms, as previously stated, which may be mono- or poly-substituted by fluorine, chlorine and/or bromine. The alkyl radical $R_4$ is either a straight chained alkyl radical having 1 to 8 carbon atoms or a branch chained alkyl radical having 3 to 8 carbon atoms; the alkenyl radical $R_4$ has 2 to 4 carbon atoms and is especially the allyl or methallyl radical; and as alkynyl radical, $R_4$ has 2 to 5 carbon atoms, and in particular is the propynyl or 1-methyl-2-propynyl radical.

As a cycloalkyl radical, $R_4$ represents either a monocyclic or a polycyclic radical, e.g. the cyclopropyl, 1-methyl-cyclopropyl, cyclobutyl, cyclopentyl, cyclohexyl, cycloheptyl, cyclooctyl radical, or bicyclooctyl, tricyclononyl, tetracyclononyl, octyhydromethenopentylanyl radicals etc. The alkyl moiety in the alkoxy and alkylthio groupings has 1 to 5 carbon atoms in the normal chain or 3 to 5 carbon atoms in the branched chain. As halogen, $R_1$ denotes fluorine, chlorine or bromine.

The 2-ureido-benzamides of the formula I are produced by reacting a benzamide of the formula II

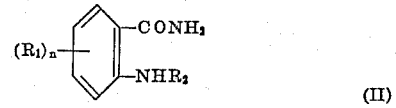

either: (a) with a carbamic acid halide of the formula III

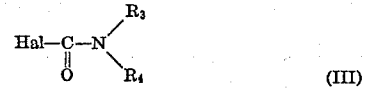

wherein Hal represents halogen up to atomic number 35, or (b) with the formation components of a carbamic acid halide of the formula III, namely phosgene and an amine of the formula IV,

in an inert solvent or diluent and in the presence of a condensation agent. According to a variation of the process of the invention, 2-ureido benzamides of the formula I, wherein $R_3$ represents hydrogen, are obtained by reacting a benzamide of the formula II with an isocyanate of the formula V:

$$R_4\text{—NCO} \quad\quad\quad (V)$$

or with a mixture of the isocyanate with a corresponding carbamic acid halide of the formula III, optionally in the presence of a condensation agent. In the formulae II to V, the symbols $R_1$ to $R_4$ and $n$ have the meanings given under formula I.

The reactions are performed in the presence of solvents or diluents which are inert to the reactants. Suitable for this purpose are hydrocarbons such as benzene, toluene, xylols, ether and ethereal compounds such as dialkylether, dioxane, tetrahydrofuran, N,N-di-substituted carboxylic acid amides such as dialkyl formamide and dialkyl acetamide, nitriles such as acetonitrile, chlorinated hydrocarbons such as chlorobenzene, chloroform and methylene chloride.

The reactions, according to the invention, with a carbamic acid halide are carried out, advantageously, in the presence of a basic condensation agent, e.g. a tertiary amine such as trialkylamine, pyridine or collidine, or in the presence of an inorganic base, e.g. an alkali metal hydroxide, acetate, hydrogen carbonate, carbonate or phosphate.

Another process for the production of the 2-ureido-benzamides of formula I comprises heating in an aqueous alkaline medium a 2-cyano-phenylurea of formula VI, substance, 0.6 parts of sodium dibutylnaphthyl sulphonate, 10 parts of sodium aluminium silicate, 78.4 parts of kaolin and 1 part of a condensate of naphthaline sulphonic acid:phend sulphonic acid:formaldehyde 3:2:1, which was diluted q.s. with water (all parts are by weight).

| Compound | Rye | Rye grass | Mustard | Sugar beet | Cucumber | Cotton | Vetch | Maize |
|---|---|---|---|---|---|---|---|---|
| 2-(N'-methyl-ureido)benzamide | 0 | 0 | 0 | 0 | 0 | 1 | 1 | 0 |
| 2-(N',N'-dimethyl-ureido)-benzamide | 0 | 1 | 0 | 0 | 0 | 0 | 0 | 2 |
| 2-(N'-ethyl-ureido)-benzamide | 0 | 0 | 0 | 0 | 0 | 0 | 0 | 2 |
| 2-(N'-n-propyl-ureido)-benzamide | 0 | 0 | 0 | 0 | 0 | 0 | 0 | 3 |
| 2-(N'-isopropyl-ureido)-benzamide | 0 | 0 | 0 | 0 | 1 | 2 | 1 | 3 |
| 2-(N'-n-butyl-ureido)-benzamide | 0 | 0 | 0 | 0 | 0 | 1 | 0 | |
| 2-(N'-1'-methylpropyl-ureido)-benzamide | 0 | 0 | 0 | 0 | 0 | 0 | 0 | 4 |
| 2-(N'-1'-methylisopentyl-ureido)-benzamide | 0 | 0 | 0 | 0 | 0 | 0 | 0 | |
| 2-(N'-allyl-ureido)-benzamide | 0 | 0 | 0 | 0 | 0 | 0 | 0 | 4 |
| 2-(N'-2'-methoxyethyl-ureido)-benzamide | 3 | 3 | 0 | 0 | 0 | 0 | 0 | |
| 2-(N'-cyclopropyl-ureido benzamide | 0 | 0 | 0 | 0 | 0 | 0 | 0 | 0 |

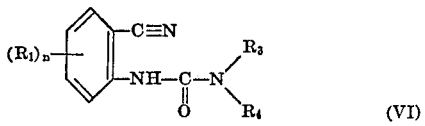

wherein $R_1$, $R_3$, $R_4$ and $n$ have the meanings given under formula I, with hydrogen peroxide.

The reaction is carried out in a solvent which is miscible with water, such as acetone or dimethylformamide, at a temperature of between 0 and 30° C. The pH of the reaction is kept between 8 and 9 by the addition of a small amount of a base.

The 2-cyano-phenylurea of formula VI can be obtained by reacting a 2-cyano-phenyl-isocyanate of formula VII

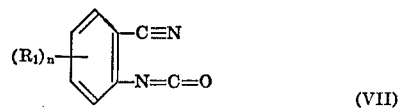

wherein $R_1$ and $n$ have the meaning given under formula I, with an amine of formula IV. The reaction takes place advantageously in a solvent that is inert to both reactants, such as benzene, toluene, xylene ether.

The new 2-ureido benzamides of the formula I are crystalline. They possess excellent herbicidal properties and can be used in both pre-emergence and post-emergence applications for controlling weeds and wild grasses.

Tests have shown that the new active substances in suitable concentrations can be used for controlling monocotyl and dicotyl field weeds, e.g. the following: species of millet (*panicum sp.*), species of mustard (*sinapis sp.*), species of goosefoot (*chenopodiaceaen*), also panicle grass (*poa annua*), foxtail (*Alopecurus agrestis*), camomile (*matricaria*), parsnip (*Pastinaca sativa L.*) etc., whereby the useful plants such as grain, maize, root vegetables, oil plants, vegetables, cotton, sorghum, soya beans and lucerne are not impaired in germination and in growth.

The herbicidal activity of the compounds of general formula I is demonstrated by the following experiment:
A 10% suspension of the active substance was mixed with garden soil so that a final concentration of 0.5 g. of active substance per liter soil was attained. The earth was then placed in pots with the following test plants: rye, mustard, ryegrass, sugar beet, cucumber, cotton, vetch and maize. The pots were then put in a green house and kept at a temperature of 20–24° C. and 70% relative humidity in continuous daylight. After 20 days the test results were evaluated according to a 10 point scale 10=plants unaffected as control
0=plants destroyed
9–1=intermediate stages of damage.

The 10% suspension was prepared from a wettable powder of the following composition: 10 parts of active The table shows that these compounds are well suited for combating monocotyl and dicotyl weeds in pre-emergence application.

The 2-ureido benzamides of formula 1, mixed together with the usual additives, are used as herbicidal agents. Furthermore, the active substances can be mixed with fertilizers and applied in this form. The range of activity of the benzamides of the invention can be widened by applying them in admixture with other herbicides, e.g. with triazine such as halogendiamino-s-triazines, alkoxy and alkylthiodiamono-s-triazines, diazines such as uracils, pyridazines, phenols, aliphatic carboxylic acids and halogen carboxylic acids, halogenated benzoic acids and halogenated phenylacetic acids, aryloxyalkane carboxylic acids and aryloxyalkane sulphonic acids, pyridine carboxylic acids, amides, thioamides, hydrozides, esters and nitriles of similar carboxylic acids, carbamic acid esters and thiocarbamic acid esters, quaternary ammonium compounds, ureas, inorganic salts etc., specially with:

2-chloro-4,6-bis-(ethylamino)-s-triazine,
2-chloro-4-ethylamino-6-isopropylamino-s-triazine,
2-chloro-4,6-bis-(methoxypropylamino)-s-triazine,
2-methoxy-4,6-bis-(isopropylamino)-s-triazine,
2-methylmercapto-4-methoxypropylamino-isopropylamino-s-triazine,
2-methylmercapto-4,6-bis(isopropylamino)-s-triazine,
2-methylmercapto-4,6-bis-(ethylamino)-s-triazine,
2-methylmercapto-4-ethylamino-6-isopropylamino-s-triazine,
2-methoxy-4,6-bis-(ethylamino)-s-triazine,
2-methoxy-4-ethylamino-6-isopropylamino-s-triazine,
2-chloro-4,6-bis-(isopropylamino)-s-triazine,
5-bromo-3-sec. butyl-6-methyl-uracil,
3-cyclohexyl-5,6-trimethylene-uracil,
5-amino-5-chloro-1-phenyl-pyridazone-(6),
3,6-dioxo-1,2,3,6-tetrahydropyridazine,
Dinitro-sec.butylphenol and salts thereof,
Pentachlorophenol and salts thereof,
Trichloroacetic acid and salts thereof,
2,2-dichloropropionic acid and salts thereof,
2-chloro-N,N-diallylacetic acid amide,
N-(3',4'-dichlorophenyl)-cyclopropane carboxylic acid amide,
Maleic acid hydrazide,
2,3,6-trichlorobenzoic acid and salts thereof,
2,3,5,6-tetrachlorobenzoic acid and salts thereof,
2-methoxy-3,5,6-trichlorobenzoic acid and salts thereof,
2-methoxy-3,6-dichlorobenzoic acid and salts thereof,
3-amino-2,5-dichlorobenzoic acid and salts thereof,
3-nitro-2,5-dichlorobenzoic acid and salts thereof,
2-methyl-3,5-dichlorobenzoic acid and salts thereof,
2-methyl-3,5-dichlorobenzoic acid and salts thereof,
2,6-dichlorobenzonitrile,
2,6-dichloro-thiobenzamide, 2,3,6-trichlorophenyl acetic acid and salts thereof,
2,4-dichlorophenoxyacetic acid and salts thereof,
2,4,5-trichlorophenoxyacetic acid and salts and esters thereof,
(2-methyl-4-chlorophenoxy)-acetic acid and salts and esters thereof,
2-(2',4',5'-trichlorophenoxy)-propionic acid and salts and esters thereof,
2-(2',4',5'-trichlorophenoxy)-ethyl-2,2-dichloropropionate
4-(2',4'-dichlorophenoxy)-butyric acid and salts and esters thereof,
4-(2'-methyl-4'chlorophenoxy)-butyric acid and salts and esters thereof,
2,3,6-trichlorobenzyloxypropanol,
4-amino-3,5,6-trichloropicolinic acid,
N'-cyclooctyl-N,N-dimethyl urea,
3-phenyl-1,1-dimethyl urea,
3-(4'-chlorophenyl)-1,1-dimethyl urea,
3-(3'trifluoromethylphenyl)-1,1-dimethyl urea,
3-(3',4'-dichlorophenyl)-1,1-dimethyl urea,
3-(3',4'-dichlorophenyl)-1-n-butyl-1-methyl urea,
3-(3',4'-dichlorophenyl)-1,1,3-trimethyl urea,
3-(3',4'-dichlorophenyl)-1,1-diethyl urea,
3-(4'-chlorophenyl)-1-methoxy-1-methyl urea,
3-(3',4'-dichlorophenyl)-1-methoxy-1-methyl urea,
3-(4'-bromophenyl)-1-methoxy-1-methyl urea,
3-(3',4'-dichlorophenyl)-3-methoxy-1,1-dimethyl urea,
3-(4'-chlorophenoxy-phenyl)-1,1-dimethyl urea,
N,N-Di-(n-propyl)-S-ethyl-thiolcarbamic acid ester,
N,N-Di-(n-propyl)-S-n-propyl-thiolcarbamic acid ester,
N-ethyl-N-(n-butyl)-S-n-propyl-thiolcarbamic acid ester,
N-phenyl-O-isopropyl-carbamic acid ester,
N-(m-chlorophenyl)-O-isopropyl-carbamic acid ester,
N-(m-chlorophenyl)-O-(4'-chloro-2'-butinyl)-carbamic acid ester,
N-(3'4'-dichlorophenyl)-O-methyl-carbamic acid ester.

The following examples illustrate the production processes for the compounds of formula I. Where not otherwise expressly stated, the temperatures are given in degrees Centigrade.

Example 1

5.7 g. of methyl isocyanate are added dropwise at room temperature (25°) to a solution of 13.6 g. of anthranilic acid amide in 100 ml. of acetonitrile. The reaction mixture is then heated, while stirring, for half an hour at 50°. After cooling, the precipitate is filtered off and recrystallized from methanol. The thus obtained 2-(N'-methyl-ureido)-benzamide has a melting point of 191° (decomposition).

Example 2

A solution of 27.2 g. of anthranilic acid amide and 30 g. of triethylamine in 200 ml. of absolute toluene is refluxed to boiling and is then mixed dropwise with 32 g. of dimethylcarbamic acid chloride. The reaction mixture is then refluxed for a further hour. The precipitate obtained after cooling is filtered off and is slurried in water. After recrystallizing from isopropanol, the obtained 2-(N,N-dimethyl-ureido)-benzamide has a melting point of 185–186° (decomposition).

Example 3

50 ml. of an aqueous hydrogen peroxide solution are added dropwise during 30 minutes at a temperature of 10° to 20° to a solution of 5.1 g. of 2-(N'-methoxy-N'-methyl-ureido)-benzonitrile in 30 ml. of acetone. By adding 1 ml. of 2 N sodium hydroxide solution the pH of the reaction mixture is kept between 8 and 9. The mixture is stirred for 12 hours at room temperature and the precipitate formed is filtered. The 2-(N'-methoxy-N'-methyl-ureido)-benzamide thus obtained melts at 181–183° (decomposition).

The 2-(N'-methoxy-N'-methyl-ureido)-benzonitrile used as starting material is obtained as follows:

A solution of 10.5 g. of 2-cyano-phenyl-isocyanate in 60 ml. of benzene is added at a temperature of 10–15° to another solution of 4.9 g. of N-methoxy-N-methyl-amine in 40 ml. of benzene. The solvent is then removed under vacuo and the residue is recrystallized from hexane. Thus 2-(N'-methoxy-N'-methyl-ureido)-benzonitrile having a M.P. of 71–72° is obtained.

In the ways described in the previous examples, the 2-ureido benzamides listed in the following table are obtained:

| Compound | M.P., degree |
| --- | --- |
| 2-(N'-methyl-ureido)-benzamide | [1] 191 |
| 2-(N'-ethyl-ureido)-benzamide | [1] 196 |
| 2-(N'-n-propyl-ureido)-benzamide | [1] 194 |
| 2-(N'-isopropyl-ureido)-benzamide | [1] 260 |
| 2-(N'-n-butyl-ureido)-benzamide | 168–170 |
| 2-(N'-1'-methylpropyl-ureido)-benzamide | [1] 190 |
| 2-(N'-1',3'-dimethylbutyl-ureido)-benzamide | [1] 180 |
| 2-(N'-allyl-ureido)-benzamide | 190–191 |
| 2-(N'-2'-chloroethyl-ureido)-benzamide | 174 |
| 2-(N'-2'-methoxyethyl-ureido)-benzamide | [1] 176 |
| 2-(N'-cyclopropyl-ureido)-benzamide | [1] 210 |
| 2-(N',N'-dimethyl-ureido)-benzamide | 185–186 |
| 4-chloro-2-(N'-methyl-ureido)-benzamide | [1] 210 |
| 4-chloro-2-(N'-n-propyl-ureido)-benzamide | [1] 215 |
| 3,5-dichloro-2-(N'-n-propyl-ureido)-benzamide | [1] 220 |
| 2-(N'-methoxy-N'-methyl-ureido)-benzamide | [1] 181–183 |
| 2-(N,N'-dimethyl-ureido)-benzamide | [1] 166–167 |
| 2-(N',2'-methylthio-ethyl-ureido)-benzamide | [1] 177–179 |
| 5-methyl-2-(N'-methyl-ureido)-benzamide | [1] 195–197 |
| 4-methoxy-2-(N'-methyl-ureido)-benzamide | [1] 196–199 |

[1] Decomposed.

The production of herbicidal compositions according to the invention is carried out in a manner known per se by the intimate mixing and grinding of the active substances of the general formula I with suitable carriers, optionally with the addition of dispersion agents or solvents which are inert to the active substances. The active substances can exist and be used in the following forms:

as solids: dusts, sprinkling agents, granulates, coated granules, impregnated granules and homogeneous granules;

as concentrates of active substances dispersible in water: wettable powder, pastes, emulsions; as liquids: solutions, aerosols.

To produce the solid forms (dusts, sprinkling agents, granulates), the active substances are mixed with solid carriers. Suitable carriers are, e.g. kaolin, talcum, bole, loess, chalk, limestone, ground limestone, ataclay, dolomite, diatomaceous earth; precipitated silicic acid, alkaline earth silicates, sodium and potassium aluminium silicates (feldspar and mica), calcium and magnesium sulphates, magnesium oxide, ground synthetic plastics, fertilizers such as ammonium sulphate, ammonium phosphate, ammonium nitrate, ureas, ground vegetable products such as grain flour, bark flour, sawdust, ground nut shells, cellulose powder, residues of plant extractions, active charcoal, etc. These carriers can be used separately or they can be mixed with each other.

The grain size of the carriers is, for dusts, advantageously up to ca. 0.1 mm., for sprinkling agents it is ca. 0.075 to 0.2 mm. and for granulates 0.2 mm. upwards.

The concentrations of active substances in the solid preparations are, as a rule, 0.5 to 80% of the total weight.

To these mixtures can also be added additives which stabilize the active substance and/or non-ionic, anion-active and cation-active substances, which, for example, improve the adhesion of the active substances on plants and parts of plants (glues and adhesives) and/or ensure a better wettability (wetting agents) and also dispersibility (dispersing agents). The following are examples of adhesives: olein-chalk mixtures, cellulose derivatives (methyl cellulose, carboxymethyl cellulose), hydroxyethyl glycol ethers of mono and dialkyl phenols having 5–15 ethylene oxide radicals per molecule and 8 to 9 carbon atoms in the alkyl radical, lignin sulphonic acids, their alkali and alkaline earth metal salts, polyethylene glycol ethers (Carbowaxes), fatty alcohol polyethylene glycol ethers having 5 to 20 ethylene oxide radicals per molecule and 8 to 18 carbon atoms in the fatty alcohol part, condensation products of ethylene oxide, propylene oxide, polyvinyl pyrrolidones, polyvinyl alcohols, condensation products of urea/formaldehyde as well as Latex products.

Concentrates of active substances which can be dispersed in water (wettable powders), pastes and emulsion concentrates, are agents which can be diluted with water to give any desired concentration. They consist of active substances, carriers, optionally additives which stabilize the active substance, surface agent substances and antifoaming agents and, optionally, solvents. The concentration of active substance in these agents is 5 to 80% of the total weight of the latter.

The wettable powders and pastes are obtained by mixing and grinding the active substances with dispersing agents and pulverulent carriers in suitable devices until homogeneity is attained. Suitable carriers are, for example, those previously mentioned for solid preparations. It is advantageous in some cases to use mixtures of different carriers. Suitable dispersing agents are, e.g. condensation products of sulphonated naphthalene and sulphonated naphthalene derivatives with formaldehyde, condensation products of naphthalene or of naphthalene sulphonic acids with phenol and formaldehyde, also alkali, ammonium and alkaline earth metal salts of lignin sulphonic acid, also alkylaryl sulphonates, alkali and alkaline earth metal salts of dibutyl naphthalene sulphonic acid, fatty alcohol sulphates such as salts of sulphated fatty alcohol glycol ethers, the sodium salt of oleyl ethionate, the sodium salt of oleyl methyl tauride, ditertiary acetylene glycols, dialkyldilauryl ammonium chloride and fatty acid alkali and alkaline earth metal salts.

Examples of anti-foaming agents are: silicones etc. The active substances are so mixed, ground, sieved and strained with the above mentioned additives that the solid particle size in wettable powders does not exceed 0.02–0.04 mm. and in the case of pastes 0.003 mm. To produce emulsion concentrates and pastes, dispersing agents such as those stated in the previous sections, organic solvents and water are used. Examples of solvents are: alcohols, benzene, xylenes, toluene, dimethyl sulphoxide and mineral oil fractions boiling between 120 and 350° C. The solvents must be practically without smell, not phytotoxic, inert to the active substances and not easily inflammable.

In addition, the agents according to the invention can be used in the form of solutions. For this application, the active substance or substances of the general formula I are dissolved in suitable organic solvents, mixtures of solvents or in water. Aliphatic and aromatic hydrocarbons, chlorinated derivatives thereof, alkyl naphthalenes, mineral oils, on their own or mixed with each other, can be used as organic solvents. The solvents should contain the active substances within a concentration range of 1 to 20% calculated on the total weight of the resulting solution.

Other biocidal active substances or agents can be mixed with the described compositions according to the invention. Thus in addition to the stated compounds of the general formula I and other herbicides, the new agents can also contain, e.g. insecticides, fungicides, bactericides, fungistatics, bacteriostatics or nematocides in order to widen the range of action. The compositions according to the invention can also contain fertilizers, trace elements etc.

Forms of preparation of these active substances are described in the following. Where not otherwise expressly stated, the terms "parts" and "percentages" are given by weight.

Wettable powder

The following constituents are used to produce (a) a 10% wettable powder, and (b) a 25% wettable powder:

(a)

10 parts of 2-(N'-methyl-ureido)-benzamide
10 parts of lignin sulphonic acid calcium salt
2 parts of adhesive consisting of 50% polyvinyl-pyrrolidone and 50% Champagne chalk
38 parts of kaolin
40 parts of Champagne chalk (b)

25 parts of 2-(N'-ethyl-ureido)-benzamide
5 parts of condensation products of naphthalene sulphonic acid, phenol sulphonic acids and formaldehyde in the ratio 3:20:0.5
4 parts of dibutyl naphthyl sulphonate sodium salt
1 part of methyl-oleyl-tauride sodium salt
15 parts of silicic acid
25 parts of neutral sodium aluminium silicate
25 parts of kaolin The stated active substances are coated on to the corresponding carriers (kaolin and chalk) and then mixed and ground with the listed additives. A wettable powder is obtained having excellent wettability and suspension properties. Suspensions of any desired active substance concentration can be prepared from this wettable powder by diluting with water.

Emulsion concentrate

The following constituents are mixed together to produce a 25% emulsion concentrate:

25 parts of 2-(N'-n-propyl-ureido)-benzamide
35 parts of methyl ethyl ketone
30 parts of xylol and
10 parts of isooctyl-phenyl polyethylene glycol This concentrate can be diluted with water to obtain emulsions of suitable concentrations. Such emulsions are suitable for controlling weeds in cultivated plantations, for which purpose application of amounts of about 0.5 to 3 kg. of a compound of formula I per hectare of treated soil is recommended.

We claim:
1. 2-(N'-methoxy-N'-methyl-ureido)-benzamide.

References Cited

UNITED STATES PATENTS

| | | | |
|---|---|---|---|
| 3,549,348 | 12/1970 | Gevirtz et al. | 71—118 |
| 3,336,131 | 8/1967 | Weil et al. | 71—118 |
| 3,228,762 | 1/1956 | Luckenbaugh | 71—118 |

OTHER REFERENCES

Doleschall et al.: "4H-3,1-Benzoxazin-4-ones etc.;" (1964), CA63 (1965) pp. 4285–86.

GLENNON H. HOLLRAH, Primary Examiner

U.S. Cl. X.R.

260—465 D